(12) United States Patent
Bauer et al.

(10) Patent No.: US 8,242,035 B2
(45) Date of Patent: Aug. 14, 2012

(54) FLAME-RESISTANT, LOW-TEMPERATURE CURING CYANATE-BASED PREPREG RESINS FOR HONEYCOMB SANDWICH COMPONENTS WITH EXCELLENT SURFACES

(75) Inventors: Monika Bauer, Berlin (DE); Rajko Wurzel, Birkenhain (DE); Christoph Uhlig, Berlin (DE); Dietmar Völkle, Biberach (DE); Volker Müller, Burgrieden (DE); Karsten Hesse, Bremen (DE); Wilfried Michaelis, Ritterhude (DE)

(73) Assignees: Fraunhofer-Gesellschaft zur Förderung der angewandten Forschung e.V., München (DE); Airbus Operations GmbH, Hamburg (DE)

( * ) Notice: Subject to any disclaimer, the term of this patent is extended or adjusted under 35 U.S.C. 154(b) by 469 days.

(21) Appl. No.: 11/747,495

(22) Filed: May 11, 2007

(65) Prior Publication Data
US 2008/0032089 A1 Feb. 7, 2008

(30) Foreign Application Priority Data
May 12, 2006 (DE) .................. 10 2006 022 372

(51) Int. Cl.
*B32B 17/02* (2006.01)
(52) U.S. Cl. .......... 442/180; 442/59; 442/116; 442/136; 442/147
(58) Field of Classification Search .................. 428/116; 442/59, 180, 116, 136, 147
See application file for complete search history.

(56) References Cited

U.S. PATENT DOCUMENTS

| | | | |
|---|---|---|---|
| 4,876,153 A | 10/1989 | Thorfinnson | |
| 5,523,148 A * | 6/1996 | Afzali-Ardakani et al. | .. 442/169 |
| 5,780,159 A * | 7/1998 | Bauer et al. | ........ 428/422.8 |
| 5,848,767 A | 12/1998 | Cappa et al. | |
| 6,156,831 A | 12/2000 | Sase et al. | |
| 6,194,495 B1 | 2/2001 | Yeager et al. | |
| 6,245,841 B1 | 6/2001 | Yeager et al. | |
| 6,403,229 B2 | 6/2002 | Yeager et al. | |
| 6,465,083 B1 | 10/2002 | Sase et al. | |
| 2001/0016616 A1 | 8/2001 | Yeager et al. | |
| 2004/0152848 A1 * | 8/2004 | Ishii et al. | ........... 525/452 |
| 2007/0190876 A1 * | 8/2007 | Ogawa et al. | ........... 442/136 |

FOREIGN PATENT DOCUMENTS

| | | |
|---|---|---|
| EP | 0 581 314 A | 2/1994 |
| EP | 0 927 737 A | 7/1999 |
| EP | 1 275 696 A | 1/2003 |
| JP | 02302446 A | 12/1990 |
| JP | 2002-146185 A | 5/2002 |
| JP | 2002-194212 A | 10/2002 |
| JP | 2003 096296 A | 4/2003 |
| JP | 2003 205260 A | 7/2003 |
| WO | WO 2005082563 A1 * | 9/2005 |

OTHER PUBLICATIONS

Bauer, M. et al.: Networks from dicyanate of bisphenol A and diphenols; Makromol. Chem., Makromol. Symp. 45, 97-103 (1991).
Bauer, M.; Pure and modified polycyanurates—polymers with great future as adhesives, casting resins, and binders for laminates; Acta Polymer., 43, 299-302 (1992).
Nichiza Misao et al., Prepreg Material; Patent Abstracts of Japan JP3243634, Oct. 30, 1991; discussed in specification, p. 4, lines 1-7.

* cited by examiner

*Primary Examiner* — Peter Y Choi
(74) *Attorney, Agent, or Firm* — Gudrun E. Huckett

(57) ABSTRACT

A textile web material impregnated with a mixture that contains at least a prepolymer prepolymerized from a starting material of one or more bifunctional or polyfunctional organic cyanates and from a starting material of one or more bifunctional or polyfunctional aromatic alcohols, wherein the one or more bifunctional or polyfunctional organic cyanates and the one or more bifunctional or polyfunctional aromatic alcohols are present in weight ratios ensuring a molar ratio of the OCN groups to the OH groups between 95:5 and 70:30 prior to prepolymerization. The mixture further contains one or more fillers.

30 Claims, No Drawings

FLAME-RESISTANT, LOW-TEMPERATURE CURING CYANATE-BASED PREPREG RESINS FOR HONEYCOMB SANDWICH COMPONENTS WITH EXCELLENT SURFACES

BACKGROUND OF THE INVENTION

The invention concerns impregnated textile web materials, so-called prepregs, suitable for the manufacture of honeycomb sandwich composites. In particular, the invention concerns prepregs that are impregnated with resins of dicyanates or polycyanates, multi-functional aromatic alcohols as well as suitable rheologic modifying agents and are suitable as cover layers (for example, in the form of fiberglass prepregs) for sandwich components for airplane interiors produced by the crushed-core method.

For panels used in airplane interiors, lightweight sandwich components with honeycomb materials are predominantly used. The exposed areas visible to the passengers, for example, the window trim, should have excellent surface quality. At the same time, these components must have excellent flame resistance. The requirements posed in civil aviation (interior paneling) in regard to fire behavior include minimal combustibility, minimal heat release rate, low smoke gas density as well as minimal toxicity of the fumes generated in a fire.

For this purpose, the honeycomb materials are coated at least on one side with a resin in the form of a semi-finished part, a so-called prepreg, and then compression-molded. The prepreg is an impregnated textile web material, for example, a fabric, woven material or nonwoven material of a suitable fiber material such as glass or the like, that is impregnated with a resin suitable for the described purpose.

In particular because of the above mentioned high fire behavior requirements, up to now primarily phenolic resins have been used as resins for the aforementioned purposes. However, phenolic resins cannot provide the required mechanical properties. For applications where the components are subjected to impact loads, for example, in the overhead luggage compartments, the high brittleness of the phenolic resins is often a problem. Moreover, polycondensation of the phenolic resins or the gases that are released during curing are most likely also the reason that the surface quality of the sandwich components produced today (based on phenolic resin prepregs) is not satisfactory so that these components must be manually post-processed (by spackling/filling and grinding) in a labor-intensive way. This process is time-consuming and cost intensive. Therefore, it is desirable to develop prepreg resins that produce sandwich components that have excellent surfaces already after completion of the so-called crushed-core method so that manual post-treatment steps are obsolete. The crushed-core method is a method according to which substantially plane or only slightly curved sandwich panels with strongly curved (tapering) edge areas are produced in such a way that the honeycomb core structure during the compression-molding (and curing) step is compression molded together with its prepreg cover layers in the selected mold and thus deformed and partially also compressed; however, the strength and the stiffness in these deformed and partially destroyed areas does not significantly decrease as a result of the deformation and partial destruction.

Depending on the type of application, additional properties such as excellent impact behavior are required, for example, in the case of freight compartments or overhead luggage compartments.

Moreover, when producing sandwich components by means of the crushed-core method, there are requirements in regard to the adhesive behavior (so-called tack or reactivation of tack) taking into account the shelf life (stability during storage) and handling of the prepregs; this must be ensured by modification (formulation) of the resin.

In order to formulate prepreg resins that provide honeycomb sandwich components with excellent surfaces, the use of addition resins appears to be more promising than the use of condensation resins because during curing no gases will be released. Addition resins with excellent mechanical properties are epoxide resins and cyanate resins. However, the epoxide resins that are commercially available today are not sufficiently frame-resistant for interior paneling of airplanes because they have an increased (impermissible) fire load, especially smoke density. In the field of electronics, halogen-substituted epoxide resins are known that have high flame-resistance. However, in the case of fire the presence of halogens leads to the generation of highly toxic and highly corrosive gases so that the use of halogen-substituted epoxide resins is not possible.

Cyanate resins instead exhibit already an intrinsic flame resistance because of their crosslinked structure (as a result of the high nitrogen contents). They combine a low heat release rate with a minimal smoke density and a low proportion of toxic gases in a fire situation.

In the literature there are a few proposals for producing prepreg materials based on cyanate resins. For example, the Japanese abstract published under publication No. 2002-194212 A discloses a curable resin composition for laminates or prepregs therefor that comprises a cyanate ester, a monofunctional phenol component, a polyphenylene ether resin, a flame retardant that cannot react with the cyanate ester, as well as a metal-containing reaction catalyst. The heat-resistant shapeable resin is used to produce a prepreg and a laminate. The prepreg is suitable for producing multi-layer printed circuits with very excellent dielectric properties. The Japanese abstract with publication No. 2002-146185 proposes a similar resin for the same type of application. However, instead of the polyphenylene ether resin a polyethylene resin is used. According to Japanese abstract with publication No. 02-302446 a prepreg and a printed circuit board produced therefrom are disclosed wherein the components for the impregnation resin is a polyaromatic cyanate, a multi-valent phenol, a polyaromatic cyanate phenol, a catalyst, and, as needed, a flame retardant. The resin composition disclosed in EP 0 889 096 A2 is also provided for use in connection with printed circuit boards; the resin composition is produced from a modified cyanate ester, a mono-functional phenol component, a polyphenylene ether resin, as well as a flame retardant. The use of multi-functional phenols is described in this printed publication as being unfavorable because the hydroxy group on one side of the molecule will not react and remain within the macromolecule; this is said to worsen the dielectric properties required for the application.

EP 0 295 375 A2 proposes to provide prepregs with a removable film that is coated with silicone in order to ensure a long-lasting tack. The resin of the prepregs is comprised of a cyanate-functionalized base material that contains additional components such as epoxy resins or maleimide resins.

Japanese abstract 03-243634 A discloses a resin that is comprised of 2-30 percent by weight of the reaction product of neopentyl glycol and terephthalic acid chloride, i.e., an oligo ester having an average molecular weight of 200-2,000 and hydroxy groups at both ends as well as 98-70 percent by weight of a resin of a cyanate ester component and a bis-maleimide component. Organic and inorganic fibers are impregnated with these resins.

The effect of multi-functional phenols on cross-linking of cyanate resins has already been studied in the past on a model system under theoretical, in particular, kinetic considerations.

SUMMARY OF THE INVENTION

It is an object of the present invention to provide prepregs that are suitable for manufacture of structural components such as lightweight honeycomb composites as well as monolithic components (for example, air-conditioning pipes) for use primarily in civil aviation that therefore should have simultaneously the following properties:

processability/compression-moldability in the range of 130-170 degrees Celsius for a period of in particular approximately 700-900 seconds;

excellent shelf life (stability when stored; storage stability);

excellent bonding of the prepregs to the core material after compression-molding, preferably according to German industrial standard DIN EN 2243 (drum peel test for honeycomb composites);

a high fire resistance of the compression-molded materials with minimal heat release rate, low smoke density as well as minimal toxicity of the fumes generated in a fire, preferably according to international standard ISO TC 92/SC1 or Airbus directive ABD0031.

In a special embodiment of the invention the prepregs should furthermore fulfill the following requirements:

when compression-molding the prepregs with the core material, surfaces should be formed that have a quality which makes mechanical post-processing obsolete;

the resin of the prepregs should have permanent tack or a tack that can be reconditioned by means of a solvent in order to ensure a slip-resistant positioning of the prepregs on the core material;

the composite material should have excellent impact behavior.

Finding a solution to the aforementioned object is difficult. This is so because cyanate resins that are especially flame-resistant and based on Phenolic novolac, for example, PT resins of the company Lonza, have very high glass transition temperatures after complete curing. In order to achieve a complete reaction of the cyanate groups it is therefore required to apply high curing temperatures. It is also possible to cure at lower temperatures because the reaction can be accelerated, for example, by use of conventional catalysts such as metal-acetylacetonate complex; however, when using such catalyst the maximum glass transition temperature is not lowered and only the first phase of the curing reaction is accelerated. At curing temperatures way below the curing temperature required for maximum conversion of the OCN-groups, the reaction will stop at a certain OCN conversion (OCN conversion depends on the curing temperature or its spacing from the maximum glass transition temperature, i.e., the glass transition temperature at maximum OCN conversion). Below a certain conversion, the crosslinked cyanate structure becomes extremely brittle.

Accordingly, other catalysts could be looked at that, at the same time, act as crosslinking modifiers that widen the crosslinked structure and simultaneously catalyze the crosslinking reaction of the cyanate resins (trimerisation). By expanding the crosslinked structure the glass transition temperature would be lowered so that curing temperatures could be selected that are lower than those required for pure cyanate ester resins; in this way, it is possible to prevent that the above described brittleness is produced that is caused by too low a conversion of the OCN groups.

This search for other catalysts is however problematic. For example, the addition of mono-functional phenols described in the literature does not appear to be promising. Monofunctional phenols as they are used in the prior art are consumed in the reaction. The basic reaction mechanism is very complex. The inventors of the present invention have found that the number of the OH groups, despite the incorporation of the phenols, remains constant. The reason is the following: for each OH group that is incorporated another OH group is released at another location. The effect of the mono-functional phenol is therefore that a trifunctional cross-linking location becomes a bifunctional bond because the OH group creates a crosslinking chain end. In this way, the mono-phenols reduce the cross-linking density excessively. They are therefore not suitable for the purposes of the present invention because they lower the glass transition temperature significantly beyond the desirable value and the resin exhibits an undesirably high sol contents. A further disadvantage resides in that components having a relatively high volatility remain in the resin; this causes degassing later on which is to be prevented because unsatisfactory surface qualities of the sandwich panels will result, for example. Moreover, the starting components are volatile; this causes processing problems (and optionally also hazardous materials problems).

Because of the presence of hydroxy groups it must also be taken into consideration that the reaction, at least within longer time periods as they occur during extended storage, will not stop, as required, before reaching the desired gel point, but instead will continue until a degree of crosslinking is reached that is way beyond the gel point and thus beyond the processability (homogenous melting) of the resins.

Excellent storage stability (shelf life) is however a mandatory requirement because the individual stages of producing the prepregs, i.e., manufacture of the resins themselves as well as impregnating the textile web material, often are not temporally connected to the manufacture of the components to be coated therewith.

In order to provide excellent bonding of the prepregs to the core material, it is necessary to provide, on the one hand, rheologic modifiers; on the other hand, the material after curing must have excellent (high) toughness. At the same time, these modifiers of the cyanate resins should not negatively affect the excellent fire properties (low heat release rate, low smoke density, the required low contents of toxic gases in the case of fire). Epoxides as co-monomers are, for example, not suitable because the modification of cyanate resins, such as PT resins, with epoxides increases significantly the heat release rate as well as the smoke density.

Moreover, the rheologic modifiers, in cooperation with the properties of the other components, preferably should affect the rheologic properties of the resins during hot curing in the press in such a way that excellent component surfaces are produced and the modifying agents (modifiers) should, if possible, improve, or at least not decrease, the impact behavior of the finally produced composite material.

Surprisingly, according to the present invention a so-called semi-finished product or a prepreg can be provided that fulfills all the aforementioned conditions. The prepreg is comprised of a textile web material, for example, fiberglass or other fibers, that is impregnated with a mixture of at least the following components:

a resin or prepolymer, produced by using at least one bifunctional or polyfunctional cyanate and at least one bifunctional or polyfunctional aromatic alcohol in mass proportions ensuring a molar ratio of OCN groups to OH groups in the starting materials for producing the prepolymer or resin between 95:5 and 70:30, and at least one filler.

For the aforementioned reasons, the prepreg of the present invention is preferably free, or substantially free, of epoxide resins.

In the context of the present invention, "prepolymer", "resin", and "prepolymerized resin" are to be understood, respectively, to mean an addition polymer that is crosslinked to a point below the gel point and made from or by using the aforementioned starting materials.

The present invention thus provides cyanate resins that are modified with multi-functional aromatic alcohols as an impregnation agent for textile web materials; the impregnated textile web materials are suitable as so-called prepregs for the manufacture of sandwich components and should serve particularly as a cover layer (in the form of fiberglass prepregs, woven prepregs or non-woven prepregs) for sandwich components for interior airplane panels made by the crushed-core method.

The modifications of the cyanate resin (i.e., the formulations) have no effect, or only a minimal effect, on the high flame resistance of the resins, i.e., the low heat release rate and the low smoke density are maintained. The proportion of toxic gases is also not increased in this way. At the same time, the modification of the cyanate resins with the aforementioned multi-functional aromatic alcohols and the one or more fillers makes it possible to cure sandwich components within the range of curing temperature and curing times used currently in the crushed-core method (primarily 160 degrees Celsius; 800 seconds); honeycomb sandwich components with excellent surfaces are produced in this way that do not require any post-processing.

It should be mentioned as a surprising effect that latency is achieved even though, by employing the aromatic alcohols as defined above, components are used whose catalytic effect would lead oen to expect continued reaction of the resin. This latency enables the manufacture, the transport, and the storage of the prepregs within the time frames that are conventional today in this connection.

In preferred embodiments a combination of fillers is utilized; these fillers contribute to the formation of excellent surfaces and excellent bonding to the honeycomb structures. Moreover, as needed, high tack can be adjusted or tack can be reactivated by spraying on a suitable solvent, for example, isopropanol, even after extended storage periods; this is desired frequently in connection with the production of prepregs.

By modifying the cyanates with multi-valent phenols, as defined above, curing at moderate temperatures (for example, 130 or 160 degrees Celsius) is possible without the intrinsic flame resistance of the pure cyanates being negatively affected (this is not the case for known modification of the cyanates with epoxides because in this case the flame resistance is significantly reduced).

Optionally, the reactivity can also be changed (increased more) by adding known catalysts, e.g. a metal acetylacetonate, as is known in the prior art.

The modification with organically coated fillers (so-called core-shell particles) increases the drum peel resistance (i.e., increases bonding to the honeycomb structure) without this greatly impacting the intrinsic flame resistance of the cyanates.

A surprising effect is primarily that a combination of the afore described desired properties that are essentially diametrically opposed in most cases is made possible with a single formulation.

The choice of the multi-functional cyanates to be used as a starting material for the resin is not critical. Principally, any at least bi-functional cyanate molecule can be used, including primarily bifunctional or polyfunctional cyanates of the structural formulas I to III listed infra:

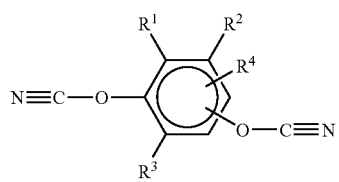

wherein $R^1$ to $R^4$ are independent from one another hydrogen, $C_1$-$C_{10}$ alkyl, $C_3$-$C_8$ cycloalkyl, $C_1$-$C_{10}$ alkoxy, halogen, phenyl or phenoxy, wherein the alkyl groups or aryl groups can be fluorinated or partially fluorinated; examples are phenylene-1,3-dicyanate, phenylene-1,4-dicyanate, 2,4,5-trifluoro-phenylene-1,3-dicyanate;

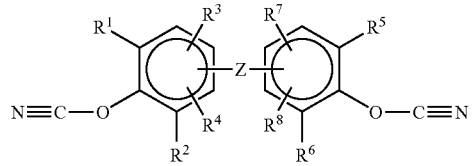

wherein $R^5$ to $R^8$ are the same as $R^1$ to $R^4$ and Z is a chemical bond, $SO_2$, $CF_2$, $CH_2$, CHF, $CH(CH_3)$, isopropylene, hexafluoro isopropylene, $C_1$-$C_{10}$ alkylene, O, $NR^9$, N=N, CH=CH, COO, CH=N, CH=N—N=CH, alkylene oxy-alkylene with $C_1$-$C_8$ alkylene, S, $Si(CH_3)_2$, or

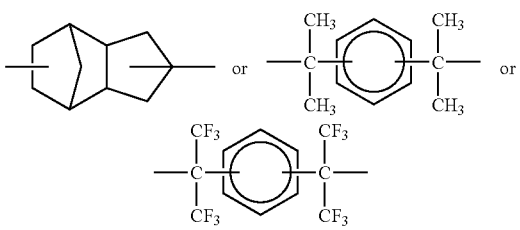

examples are 2,2-bis(4-cyanato-phenyl)propane, 2,2-bis(4-cyanato-phenyl)hexafluoro propane, bisphenylene-4,4'-dicyanate; and

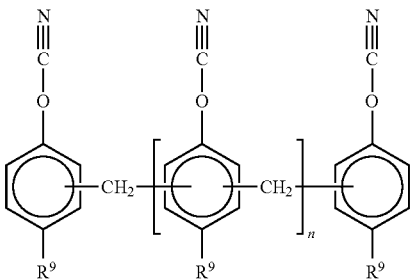

wherein $R^9$ is hydrogen or $C_1$-$C_{10}$ alkyl and n is an integer of 0 to 20.

The aforementioned cyanates can be used as monomers or as prepolymers alone or in mixtures with one another or in mixtures with additional bifunctional or polyfunctional cyanates.

As examples of especially suited cyanates, the dicyanate of bisphenol A (4,4'-dimethyl methylene diphenyl dicyanate), 4,4'-ethylidene diphenyl dicyanate or compounds of the formula III should be mentioned, wherein n=1, 2, or 3, wherein $R^9$ is hydrogen, and wherein the methylene group is in the ortho position relative to the cyanate group, respectively.

The multifunctional (multi-valent) aromatic alcohols to be used are preferably compounds of the above mentioned structural formulas I to III for the cyanates, in which the cyanate groups are replaced by hydroxy groups. Of course, mixtures of alcohols as defined above can be used also.

Preferably, the multi-valent aromatic alcohols are multi-valent phenols. Instead, it is also possible to employ condensed aromatic compounds, for example, naphthol derivatives. In an especially preferred embodiment, the multi-valent phenols or other aromatic compounds are divalent (bifunctional) alcohols. The hydroxy group is directly bonded to the aromatic ring, respectively.

Bisphenol A, 4,4'-ethylidene bisphenol or bis(hydroxyphenyl)sulfide should be mentioned as examples of especially suited bisphenols.

The material of the filler or fillers is appropriately selected in accordance with the desired product properties. For example, fillers such as microfillers of the type used as reinforcement materials in thermosetting resins can be used, i.e., fillers with a particle size distribution having a size concentration in the micrometer range. But nanofillers with smaller particle sizes (particle size distribution with a size concentration below the micrometer range) can be used also, for example, aerosils with average particle size smaller than 100 nm. Independent of the use of microfillers and/or nanofillers, the fillers are preferably selected from inorganic fillers that are optionally organically modified and/or coated. Inasmuch as the fillers contain organophosphorus components, these components improve the fire safety. Suitable filler materials are, for example, silicon dioxide, ceramic materials, organically modified silicones or siloxanes or mixtures thereof, in particular those with very high surface areas and/or small particle sizes, for example, Aerosil® of the Degussa company, organophosphorus compounds such as EXOLIT OP 930 of the Clariant company, optionally organophilic modified bentonite such as Nanofil 2 of the Südchemie company or inorganic particles that are coated with an organic coating (for example, an acrylate coating) or particles of an organic-inorganic matrix, for example, of a heteroorganopolysiloxane (so-called core-shell particles). The latter can be, for example, configured such that they have a soft (elastomeric) core and a hard (polymer) shell. Such particles can have properties modifying the fracture toughness, for example.

It has been found that especially when silicon dioxide and/or silicates having very large surfaces areas are used as fillers, honeycomb sandwich components with excellent surface properties can be obtained that do not require any post-processing. Especially suitable silicon dioxide materials for this purpose are pyrogenic/highly dispersed silica materials such as Aerosils. Suitable silicates are micaceous silicates such as montmorillonite. e.g. nanofil, that is optionally organically modified. Excellent products are obtained by combining the two materials.

The fillers can be used alone or in mixtures. It was found that mixtures of different fillers of different materials are especially suitable. Their proportion within the resin can be preferably approximately up to 20 percent by weight.

Optionally, further additives can be added to the starting material for the resins or such additives can be subsequently admixed to the pre-polymerized resin. Examples of such additives are surface-modifying agents, for example, agents that reduce the surface tension, e.g. fluorocarbon modified polymer EFKA-8300 available through EFKA Additives BV, The Netherlands.

It is particularly surprising in accordance with the present invention that the addition of fillers to the aforementioned cyanate resin materials causes a higher toughness of the cured materials so that bonding of the prepregs according to the invention to the core materials is improved.

For producing the prepolymerized compound provided for impregnating the textile fiber material, the cyanate component or components and the multi-functional aromatic alcohol or alcohols are dissolved generally separately or jointly in a common solvent in a suitable quantitative ratio with regard to the above-mentioned molar ratio of OCN and OH. Accordingly, the phenol component is usually added in a ratio of 2 to 20 percent by weight. Solvents for cyanate resins are known to a person skilled in the art; a frequently employed solvent is methyl ethyl ketone. Inasmuch as the solutions are processed separately, they are subsequently mixed well. Optionally, for accelerating the crosslinking action, a catalyst of the type known in the art can be added, for example, a metal acetylacetonate complex.

The filler or fillers can be added to one of the solutions or the only solution or the combined solutions of the cyanate and alcohol components at any suitable point in time. The dispersion is realized in general with conventional auxiliaries. The resulting solution or dispersion that can be optionally concentrated or diluted to a suitable viscosity, a suitable textile web material, for example, a fabric, nonwoven or woven material of fiberglass or another mineral fiber or yet another inorganic fiber, can be impregnated, for example, by means of a vertical prepreg device. The impregnated textile web is subsequently dried by heating causing the solvent to evaporate and the resin to prepolymerize. The duration of drying and thus the degree of prepolymerization that is achieved is selected in accordance with the desired specification, respectively. However, the desired prepolymerization stage must be reached before the so-called gel point is reached so that a renewed melting and thus a later shaping is possible. A suitable temperature range for drying is the range of between 80 to 200 degrees Celsius; this is not to be understood as a limitation to the scope of the invention. The resulting prepreg is stored preferably with cooling (in general at approximately 0 to −26 degrees Celsius, preferably at −26 degrees Celsius). For the final processing (shaping under heat and pressure) of the prepregs, usually temperatures of between 100 to 200 degrees Celsius are usually employed. The minimum pressing times are generally approximately five minutes. The pressures are to be matched to the respective processing technology (for example, hot pressing method, vacuum pressing method) and the desired product (laminate, core composite) and are in general within the range of approximately 1 to 20 bar (approximately 1 bar is typical for single-layer laminate; approximately 12 bar is typical for crushed-core components; approximately 20 bar is typical for a multi-layer laminate), the range mentioned here is not to be understood as a limitation to the scope of the invention. Sandwich panels are produced by hot pressing methods from the honeycomb core material with a prepreg cover layer on the top face and the bottom face, respectively, and optionally with compression of the core.

DESCRIPTION OF PREFERRED EMBODIMENTS

In the following the invention will be explained in more detail with aid of examples. The products mentioned herein after refer to the following compounds and materials:

Primaset® PT15 (available from Lonza) is an oligo(3-methylene-1,5-phenylcyanate).

Primaset® PT30 (also available from Lonza) is an oligo(3-methylene-1,5-phenylcyanate) having a functionality higher than PT 15).

Primaset® LeCy (available from Lonza) is 4,4'-ethylidene bisphenylcyanate.

Examples

Group 1

Reactions of cyanate components (multi-functional as well as bifunctional ones) with bisphenols.

Example 1.1 Reaction of Primaset® PT15 (Lonza) or of Primaset® PT30 (Lonza) with bis(hydroxyphenyl)sulfide.

Example 1.2 Reaction of Primaset® PT15 or of Primaset® PT30 with bisphenol A.

Example 1.3 Reaction of Primaset® LeCy (Lonza) with bis(hydroxyphenyl)sulfide.

Example 1.4 Reaction of Primaset® LeCy with bisphenol A.

The cyanate component as well as the bisphenol component are dissolved in methyl ethyl ketone (MEK). Typically, approximately 90-70 percent by weight, preferably approximately 80 percent by weight, of the resin starting material is combined with 10-30 percent by weight, preferably approximately 20 percent by weight, of methyl ethyl ketone. Subsequently, the solutions are combined and mixed while being stirred. The bisphenol component can be added in a ratio of approximately 2-20 percent by weight relative to the resin component.

This solution is used for impregnating a fiberglass web. The impregnated web is subsequently dried by being heated, preferably to approximately 80 to 130 degrees Celsius, i.e., the solvent is evaporated and the resin prepolymerized. The duration of drying and thus the prepolymerization stage are within a range of approximately 1 to 10 minutes, depending on the selected temperature (and actual resin composition); however, the desired prepolymerization stage must be reached before reaching the so-called gel point so that a renewed melting and thus shaping are possible. The resulting prepregs are stored in a cooled environment. Final processing (shaping under heat and pressure) of the prepregs was carried out at a temperature of 160 degrees Celsius at a pressing time of 800 seconds. The product, a sandwich panel, was then produced by hot compression-molding from a honeycomb core material, wherein a prepreg cover layer was applied to the top side and the bottom side, respectively, and the core material was compressed.

Examples

Group 2

Preparation of Cyanate-Ester Resins from Combinations of Cyanate components with bisphenols.

Example 2.1 Reaction of mixtures of Primaset® PT 15 and Primaset® PT30 with bis(hydroxyphenyl)sulfide.

Example 2.2 Reaction of mixtures of Primaset® PT15 and Primaset® PT30 with bisphenol A.

Example 2.3 Reaction of mixtures of Primaset® PT15 and Primaset® LeCy with bis(hydroxyphenyl)sulfide.

Example 2.4 Reaction of mixtures of Primaset® PT15 and Primaset® LeCy with bisphenol A.

Example 2.5 Reaction of mixtures of Primaset® PT30 and Primaset® LeCy with bis(hydroxyphenyl)sulfide.

Example 2.6 Reaction of mixtures of Primaset® PT30 and Primaset® LeCy with bisphenol A.

The course of processing corresponds to that presented in the Examples—Group 1. The cyanate components are separately dissolved and subsequently combined with the bisphenol solution. The weight proportions correspond to those disclosed in Examples—Group 1. The ratios of cyanate components relative to one another can be selected within the resulting remaining range across the entire bandwidth.

Examples

Group 3

Admixture of additives for obtaining improved surfaces in the cured state as well as higher drum peel values without loss of fire resistance for the resin mixtures of Examples—Groups 1 and Group 2.

Example 3.1 Admixture of Aerosil®.
Example 3.2 Admixture of Nanofil®.
Example 3.3 Admixture of Exolit OP 930.
Example 3.4 Admixture of combinations of examples 3.1. to 3.3.

The admixture of the additives is realized in the combined solutions that have been prepared in accordance with the disclosure of Examples—Group 1 and Group 2 with the aid of dispersion devices. The amount of added additives can preferably be in sum total up to 20 percent by weight; when adding only one additive, the amount is preferably maximally approximately 10 percent by weight.

Examples

Group 4

Example 4.1 Admixture of additives (fillers) for obtaining an especially smooth surface 65 g Primaset® PT15 (Lonza), 25 g Primaset® LeCy (Lonza) and 10 g bisphenol A are weighed into flask and melted at 120 degrees Celsius. The melt is subsequently degassed in vacuum. To the degassed mixture, 2 parts Aerosil® (Degussa) and/or 2.5 parts Nanofil 2 (Südchemie) and/or 10 parts SLM P52 (Wacker) and/or 8.8 parts Exolit OP 930 are added in portions and admixed to the mixture with the aid of a dispersion device. The resulting mixture is subsequently placed into a mold preheated to 140 degrees Celsius and then cured in accordance with the following regime: 6 hours at 140 degrees Celsius; 1 hour at 250 degrees Celsius. The resulting polymer is yellowish, opaque, has a glass transition temperature of 217 degrees Celsius and can be polished to an average surface roughness of Ra=0.033 micrometers.

Example 4.2 Admixture of core-shell particles SLM P52 for obtaining high drum peel values without loss of fire resistance of the resin mixture of the Examples—Groups 1, 2, and 3.

Admixture of the particles is realized in the combined solutions as disclosed in connection with the Examples—Groups 1, 2, and 3 by using a dispersion device. The added proportion of additives can be preferably be in sum total up to 20 percent by weight; when additional additives are present (Examples—Group 3), it is possible to add up to approximately 30 percent by weight of the additives.

The following table shows some results for the sandwich structures produced with prepregs of the aforementioned examples. The surface quality of all sandwich structures was excellent with regard to visual as well as haptic evaluation criteria.

The specification incorporates by reference the entire disclosure of German priority document 10 2006 022 372.1 having a filing date of 12 May 2006.

While specific embodiments of the invention have been shown and described in detail to illustrate the inventive principles, it will be understood that the invention may be embodied otherwise without departing from such principles.

What is claimed is:

1. A textile web material impregnated with a mixture comprising at least the following components:
   a prepolymer prepolymerized from a first starting material of one or more bifunctional or polyfunctional organic cyanates and a second starting material of one or more bifunctional or polyfunctional aromatic alcohols, wherein said one or more bifunctional or polyfunctional organic cyanates and said one or more bifunctional or polyfunctional aromatic alcohols are present in weight ratios ensuring a molar ratio of the OCN groups to the OH groups between 95:5 and 70:30 in the first and second starting materials; and
one or more fillers;
wherein said one or more bifunctional or polyfunctional organic cyanates are selected from cyanates of the structural formulas I, II, and III, as well as from mixtures of and/or prepolymers of said cyanates of said structural formulas I, II, and III

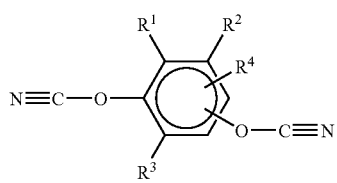

wherein $R^1$ to $R^4$ are, independent from one another, hydrogen, $C_1$-$C_{10}$ alkyl, $C_3$-$C_8$ cycloalkyl, $C_1$-$C_{10}$ alkoxy, phenyl or phenoxy;

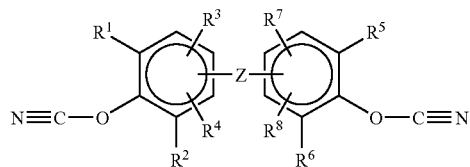

wherein $R^5$ to $R^8$ are the same as $R^1$ to $R^4$ above and Z is a chemical bond, $SO_2$, $CH_2$, $CH(CH_3)$, isopropylene, $C_1$-$C_{10}$ alkylene, O, $NR^9$, N=N, CH=CH, COO, CH=N, CH=N—N=CH, alkylene oxyalkylene with $C_1$-$C_8$ alkylene, S, $Si(CH_3)_2$,

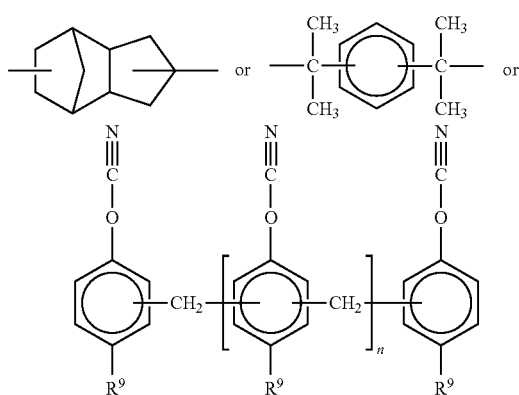

wherein $R^9$ is hydrogen or $C_1$-$C_{10}$ alkyl and n is an integer of 0 to 20;
wherein said one or more bifunctional or polyfunctional aromatic alcohols are selected from the group consisting of the compounds having a structure according to said structural formulas I, II, and III, with the proviso that the cyanate groups in said structural formulas I, II, and III are replaced with OH groups.

2. The textile web material according to claim 1, wherein at least one of said one or more bifunctional polyfunctional cyanates is selected from the group consisting of novolac cyanates, bisphenol A dicyanate derivative, 4,4'-ethylidene diphenyl dicyanate and compounds of the structural formula III

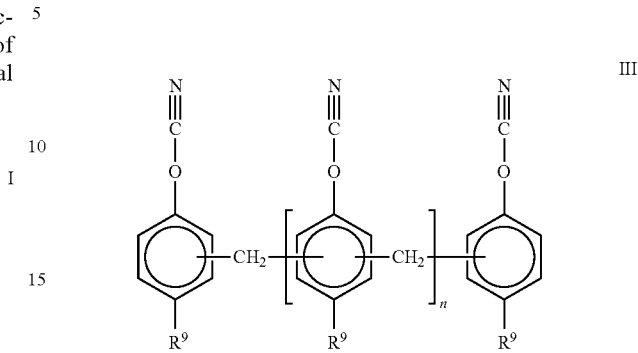

wherein n is 1, 2, or 3, $R^9$ is hydrogen and the methylene group is in the ortho position relative to the cyanate position, respectively.

3. The textile web material according to claim 2, wherein at least one of said one or more aromatic alcohols is selected from bisphenol A and bis(hydroxyphenyl)sulfide.

4. The textile web material according to claim 1, wherein at least one of said one or more aromatic alcohols is selected from bisphenol A and bis(hydroxyphenyl)sulfide.

5. The textile web material according to claim 1, wherein the prepolymer is manufactured exclusively from said one or more bifunctional or polyfunctional organic cyanates and said one or more bifunctional or polyfunctional aromatic alcohols.

6. The textile web material according to claim 1, wherein at least one of said one or more fillers is selected from the group consisting of inorganic microfillers and inorganic nanofillers.

7. The textile web material according to claim 1, wherein at least one of said one or more fillers comprises organophosphorus components.

8. The textile web material according to claim 1, wherein at least one of said one or more fillers is selected from substances of the group consisting of silicon dioxide, ceramic materials, organically modified silicones, siloxanes, and mixtures thereof.

9. The textile web material according to claim 8, wherein said substances have a small particle size of a particle size distribution with a size concentration below the micrometer range.

10. The textile web material according to claim 1, wherein at least one of said one or more fillers is selected from core-shell particles.

11. The textile material according to claim 1, wherein at least two of said one or more fillers are provided and wherein said at least two fillers differ from one another with regard to size; or material; or material and size.

12. The textile web material according to claim 1, wherein said one or more fillers are present in said mixture in a quantity of up to 20 percent by weight.

13. The textile web material according to claim 1, wherein said mixture further comprises at least one additive.

14. The textile web material according to claim 13, wherein said at least one additive is a surface-modifying agent or a surface tension reducing agent.

15. The textile web material according to claim 1, wherein the textile web material is a woven fabric or a knitted fabric or a nonwoven fabric comprised of a fire-proof fiber material.

16. The textile web material according to claim 1, wherein the textile web material is comprised of fiberglass.

17. The textile web material according to claim 1, wherein the prepolymer has a degree of crosslinking that is below the gel point of the prepolymer.

18. A method for producing an impregnated textile web material according to claim 1, the method comprising the steps of:
 a) dissolving in one solvent or different solvents, separately in several solutions or jointly in a single solution, a first starting material of one or more bifunctional or polyfunctional organic cyanates and a second starting material of one or more bifunctional or polyfunctional aromatic alcohols, wherein said first and second starting materials are present in weight ratios ensuring a molar ratio of the OCN groups to the OH groups between 95:5 and 70:30 in the first and second starting materials and, when dissolving is done separately so as to produce separate solutions, combining the separate solutions to a combined solution;
 b) admixing one or more fillers to the single solution or the combined several solutions or one of the several solutions before combining the several solutions and optionally adjusting the viscosity by evaporating the solvent or by adding a solvent;
 c) impregnating a textile web material with the mixture of step b), and
 d) drying the impregnated textile web material of step c).

19. The method according to claim 18, wherein in the step d) heat is applied.

20. The method according to claim 18, wherein the step d) is carried out in a temperature range between 80 degrees Celsius and 200 degrees Celsius.

21. A structural component comprising the textile web material according to claim 1, wherein the structural component is a composite or a monolithic component.

22. The structural component according to claim 21, wherein the composite is a honeycomb sandwich composite or a two-layer laminate or multi-layer laminate.

23. The structural component according to claim 22, wherein the honeycomb sandwich composite comprises a honeycomb core, wherein said textile web material is connected to opposite faces of said honeycomb core.

24. The structural component according to claim 21, wherein the composite comprises a substrate, wherein the textile web material is compression-molded to the substrate at 100-200 degrees Celsius for approximately 3-7 minutes at approximately 1-20 bar in order to produce the composite compound.

25. The structural component according to claim 21, wherein the composite comprises a substrate, wherein the textile web material and the substrate are bonded to one another by hot pressing or vacuum pressing.

26. The structural component according to claim 21, wherein the composite comprises a substrate having a honeycomb structure.

27. The structural component according to claim 26, wherein the textile web material and the substrate are bonded to one another by pressing and wherein in the step of pressing the honeycomb structure is deformed according to the crushed-core method.

28. The structural component according to claim 21, wherein the monolithic component is a pipe for airconditioning.

29. The textile web material according to claim 6, wherein said inorganic microfillers are organically modified and/or coated and wherein said inorganic nanofillers are organically modified and/or coated.

30. The textile web material according to claim 12, wherein said one or more fillers are present in said mixture in a quantity of up to 15 percent by weight.

* * * * *